(12) United States Patent
Nishikawa

(10) Patent No.: US 10,327,431 B2
(45) Date of Patent: Jun. 25, 2019

(54) RECIPROCATING MECHANISM FOR A FISHING REEL

(71) Applicant: Shimano Inc., Sakai, Osaka (JP)

(72) Inventor: Tomohiro Nishikawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/910,694

(22) Filed: Mar. 2, 2018

(65) Prior Publication Data

US 2018/0368376 A1    Dec. 27, 2018

(30) Foreign Application Priority Data

Jun. 27, 2017  (JP) ................................ 2017-125146

(51) Int. Cl.
*A01K 89/01* (2006.01)

(52) U.S. Cl.
CPC .... *A01K 89/0114* (2013.01); *A01K 89/01141* (2015.05); *A01K 89/01142* (2015.05)

(58) Field of Classification Search
CPC .......... A01K 89/0114; A01K 89/01141; A01K 89/01142; A01K 89/01143; A01K 89/01; A01K 89/012; A01K 89/01916; A01K 89/0191; A01K 89/02
USPC ................................................ 242/241, 274
See application file for complete search history.

(56) References Cited

U.S. PATENT DOCUMENTS

| | | | | |
|---|---|---|---|---|
| 5,601,244 A * | 2/1997 | Kawabe | ............. | A01K 89/0108 242/232 |
| 5,921,489 A * | 7/1999 | Shibata | ............. | A01K 89/0114 242/242 |
| 7,290,728 B1 * | 11/2007 | da Rosa | ............. | A01K 89/0114 242/242 |
| 2001/0042804 A1 * | 11/2001 | Kawabe | ............. | A01K 89/0114 242/273 |
| 2005/0006510 A1 * | 1/2005 | Cheung | ............. | A01K 89/0114 242/241 |
| 2005/0045758 A1 * | 3/2005 | Ban | ................... | A01K 89/0114 242/242 |
| 2005/0127221 A1 * | 6/2005 | Morise | ............... | A01K 89/0114 242/242 |
| 2007/0029425 A1 * | 2/2007 | Young | ................ | A01K 89/0114 242/242 |
| 2007/0114315 A1 * | 5/2007 | Young | ................ | A01K 89/0114 242/277 |

FOREIGN PATENT DOCUMENTS

JP        2016-220261 A     12/2016

* cited by examiner

*Primary Examiner* — Michael R Mansen
*Assistant Examiner* — Raveen J Dias
(74) *Attorney, Agent, or Firm* — Global IP Counselors, LLP

(57) ABSTRACT

A reciprocating mechanism for a fishing reel includes a first rotating body that rotates around a first axis extending in a direction perpendicular to a spool shaft, a second rotating body that rotates around a second axis disposed at a distance from the first rotating body in the spool shaft direction, and parallel to the first axis, a rotation transmission body bridged between the first rotating body and the second rotating body, and configured to circulate when a handle is rotated, and a movable body having a part engaging the rotation transmission body, the movable body reciprocating in the spool shaft direction together with the spool shaft, when the rotation transmission body is circulated, and when viewed from a direction along the first axis, a virtual straight line that connects the first axis and the second axis is inclined with respect to an axis of the spool shaft.

7 Claims, 6 Drawing Sheets

RECIPROCATING MECHANISM FOR A FISHING REEL

CROSS-REFERENCE TO RELATED APPLICATIONS

This application claims priority to Japanese Patent Application No. 2017-125146, filed on Jun. 27, 2017. The entire disclosure of Japanese Patent Application No. 2017-125146 is hereby incorporated herein by reference.

BACKGROUND

Field of the Invention

The present invention relates to a reciprocating mechanism for a fishing reel, and in particular to a reciprocating mechanism for a fishing reel in which a spool shaft is reciprocated in a spool shaft direction, accompanying rotation of a handle. The spool shaft direction being the direction along which the spool shaft extends.

Background Art

Fishing reels that comprise a reciprocating mechanism for uniformly winding a fishing line onto a spool are well known. For example, in the reciprocating mechanism for a fishing reel, a fishing line can be uniformly wound onto the spool, by a spool shaft and a spool that is fixed on the spool shaft that reciprocates in a spool shaft direction (i.e., the direction in which the spool shaft extends), accompanying the rotation of a handle.

For example, the reciprocating mechanism of Japanese Laid-Open Patent Publication No. 2016-220261 comprises a first rotating body, a second rotating body, a rotation transmission body and a movable body. The first rotating body is rotated in conjunction with the rotation of a handle. The second rotating body is disposed at a distance from the first rotating body. The rotation transmission body transmits the rotation of the first rotating body to the second rotating body. The movable body engages the rotation transmission body and is reciprocated in the spool shaft direction accompanying the actuation of the rotation transmission body.

Meanwhile, for the movement amount of the movable body in the spool shaft direction, that is, the stroke amount of the spool, an optimal stroke amount to match the size and shape of the spool is individually set. In the reciprocating mechanism of Japanese Laid-Open Patent Publication No. 2016-220261, the stroke amount of the spool is set by adjusting the interval between the first rotating body and the second rotating body in the spool shaft direction. In this design, a rotation transmission body having a circumferential length corresponding to the stroke amount of the spool that is set must be individually manufactured, and there is a risk of increasing the manufacturing cost of the reciprocating mechanism.

SUMMARY

The object of the present invention is to decrease the manufacturing cost in a reciprocating mechanism for a fishing reel.

The reciprocating mechanism for a fishing reel according to one aspect of the present invention is one in which a spool shaft is reciprocated in a spool shaft direction (i.e., the direction in which the spool shaft extends), accompanying the rotation of a handle, and that comprises a first rotating body, a second rotating body, a rotation transmission body, and a movable body. The first rotating body rotates around a first axis that extends in a direction that is substantially perpendicular to the spool shaft direction. The second rotating body is disposed at a distance from the first rotating body in the spool shaft direction and rotates around a second axis that is substantially parallel to the first axis. The rotation transmission body is bridged to the first rotating body and the second rotating body, and circulates and transmit a rotation of the first rotating body to the second rotational body accompanying the rotation of the handle. The movable body engages with the rotation transmission body, is reciprocated in the spool shaft direction together with the spool shaft accompanying the circulation of the rotation transmission body. When seen from the direction along the first axis, the virtual straight line that connects the first axis and the second axis are inclined with respect to the spool shaft direction.

In this reciprocating mechanism, since the virtual straight line that connect the first axis and the second axis are inclined with respect to the axis of the spool shaft, the rotation transmission body that is bridged to the first rotating body and the second rotating body is disposed to be inclined with respect to the spool shaft. Consequently, in comparison to when the rotation transmission body is disposed along the spool shaft direction, the movement amount in the spool shaft direction of an engagement body that circulates together with the rotation transmission body is decreased. That is, by changing the inclination angle of the virtual straight line that connect the first axis and the second axis with respect to the spool shaft, the so-called stroke amount of the spool shaft can be adjusted without changing the circumferential length of the rotation transmission body. Thus, in a fishing reel having different stroke amounts, individually manufacturing a rotation transmission body that matches the stroke amount is not be required, and the manufacturing cost of the reciprocating mechanism can be decreased.

Preferably, the reciprocating mechanism further comprises an engagement body that is fixed on the rotation transmission body and circulates together with the rotation transmission body, the movable body comprises a guide groove that extends in a direction that intersects the spool shaft direction and to which the engagement body engages, and the movable body moves within the guide groove accompanying the circulation of the rotation transmission body and the reciprocation of the movable body. In this embodiment, it is possible to reliably reciprocate the movable body in the spool shaft direction by the engagement body that engages the rotation transmission body and the movable body.

Preferably, the second axis is positioned rearward of the first axis in the spool shaft direction, and, when seen from the spool shaft direction, the second axis is positioned lower than the first axis.

Preferably, the guide groove comprises an inclined portion. In this embodiment, by guiding the circulation of the engagement body with the inclined portion, the movement speed of the movable body in the spool shaft direction with respect to the rotational speed of the first rotating body and the second rotating body can be increased or decreased. Accordingly, since the reeling pitch when reeling the fishing line can be changed, it is possible to obtain the optimal winding shape.

Preferably, the guide groove comprises a straight portion.

Preferably, the guide groove comprises first and second straight portions at both ends, and the first and second straight portions are disposed offset from each other in the spool shaft direction. In this case, since the movement amount of the movable body in the spool shaft direction is less than the movement amount of the engagement body in the spool shaft direction, the stroke amount of the spool can be decreased.

Preferably, the inclined portion is connectedly disposed at between the first and second straight portions.

According to the present invention, in a reciprocating mechanism for a fishing reel, the manufacturing cost can be suppressed.

DETAILED DESCRIPTION OF THE EMBODIMENTS

Overall Structure of the Fishing Reel

Figure 1:
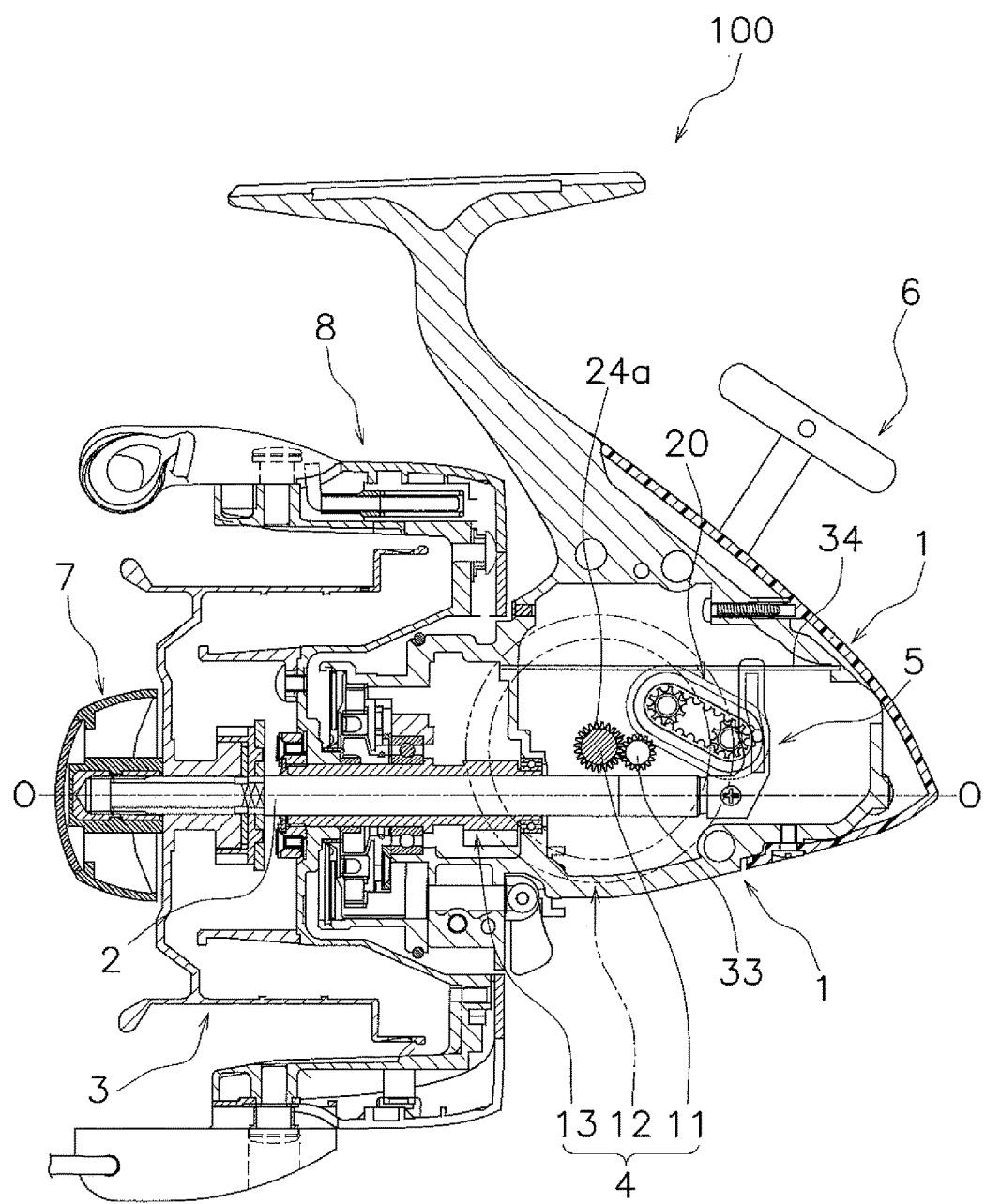
FIG. 1 is a longitudinal cross-sectional view of a spinning reel employing one embodiment of the present invention.

FIG. 1 is a longitudinal cross-sectional view of a spinning reel 100 (one example of a fishing reel) employing one embodiment of the present invention. The spinning reel 100 comprises a reel body 1, a spool shaft 2, a spool 3, a rotor drive mechanism 4, and a reciprocating mechanism 5. Meanwhile, regarding forward and rearward in the following description, when fishing, the direction that the fishing line is unreeled (cast) is forward and the opposite direction is rearward. Specifically, the left side in FIG. 1 is defined as forward and the right side is defined as rearward, as will be described. Furthermore, regarding up and down, when mounting the reel body 1 to a fishing rod, the side on which the fishing rod is mounted is up and the opposite side is down. Specifically, the upper side in FIG. 1 is defined as up and the lower side is defined as down, as will be described. Furthermore, the direction in which the spool shaft 2 extends is defined as the spool shaft direction and the direction in which the drive shaft 11 extends is defined as the drive shaft direction, respectively, as will be described.

The reel body 1 comprises an internal space, and a rotor drive mechanism 4 and a reciprocating mechanism 5 that uniformly winds a fishing line onto the spool 3, etc. are housed in the internal space. A handle 6 is mounted on a side of the reel body 1 so as to be rotatable with respect to the reel body 1.

The spool shaft 2 is formed extending in the forward-rearward direction and supported on the reel body so as to be movable in the spool shaft direction.

The spool 3 is a member having an outer perimeter on which the fishing line is wound. The spool 3 is fixed on the spool shaft 2 by a knob member 7 that screws onto the tip of the spool shaft 2. The spool shaft 3 reciprocates the reel body 1 in the spool shaft direction together with the spool shaft 2 via the rotor drive mechanism 4 accompanying the rotation of the handle 6.

Rotor Drive Mechanism 4

The rotor drive mechanism 4 is a mechanism for transmitting the rotation of the handle 6 to the rotor 8, such that the rotor 8 is rotated in conjunction with the rotation of the handle 6. The rotor 8 is a member that winds the fishing line onto the spool 3 and is rotatably supported on the reel body 1. The rotor drive mechanism 4 comprises a drive shaft 11, a drive gear 12, and a pinion gear 13.

The drive shaft 11, to which the handle 6 is coupled so as to be integrally rotatable therewith, is rotated in conjunction with the rotation of the handle 6. The drive shaft 11 extends in the direction that is perpendicular to the spool shaft direction and is rotatably supported on the reel body 1. A first gear 24a, which will be described below, is mounted on the drive shaft 11 so as to be integrally rotatable therewith.

The drive gear 12 is a face gear and is integrally rotated together with the drive shaft 11. The pinion gear 13 is a tubular gear that meshes with the drive gear 12. The pinion gear 13 is rotatably supported on the reel body 1, and the spool shaft 2 extends through the inner perimeter part thereof. The rotor 8 is coupled with the pinion gear 13 so as to be integrally rotatable therewith.

Reciprocating Mechanism 5

The reciprocating mechanism 5 is a mechanism for reciprocating the spool shaft 2 in the spool shaft direction accompanying the rotation of the handle 6. A fishing line is uniformly wound onto the spool 3 by the reciprocating mechanism 5 and the rotor drive mechanism 4. As shown enlarged in FIG. 2, the reciprocating mechanism 5 comprises a first rotating body 21, a second rotating body 22, a rotation transmission mechanism 23, a rotation transmission mechanism 24, an engagement body 25, and a movable body 26. The first rotating body 21, the second rotating body 22, and the rotation transmission body 23 are housed in a housing 20 that is disposed in an internal space of the reel body 1.

The housing 20 comprises a first support hole 20a, a second support hole 20b, and a guide hole 20c. The first support hole 20a and the second support hole 20b are formed extending through the housing 20 in the drive shaft direction. The guide hole 20c is formed, at a distance from the rotation transmission body 23, along the outer perimeter of the rotation transmission body 23.

First Rotating Body 21

The first rotating body 21 is coupled to a first shaft 31, so as to be integrally rotatable therewith, that is rotatably supported in the first support hole 20a. The first shaft 31 extends in the drive shaft direction, and the first rotating body 21 rotates around a first axis A of the first shaft 31. On the outer perimeter portion of the first rotating body 21, a plurality of first tooth portions 21a are formed spaced apart in the circumferential direction.

Second Rotating Body 22

The second rotating body 22 is disposed at a distance from the first rotating body 21 in the spool shaft direction. The second rotating body 22 is disposed rearward of the first rotating body 21 in the spool shaft direction. The external diameter of the second rotating body 22 is substantially the same diameter as the first rotating body 21.

The second rotating body 22 is coupled to a second shaft 32, so as to be integrally rotatable therewith, that is rotatably supported in the second support hole 20b. The second shaft 32 extends in the drive shaft direction, and the second rotating body 22 rotates around a second axis B of the second shaft 32. On the outer perimeter portion of the second rotating body 22, a plurality of second tooth portions 22a are formed spaced apart in the circumferential direction.

The second axis B is an axis that is parallel to the first axis A. In the present embodiment, the second axis B is disposed rearward of the first axis A in the spool shaft direction and lower than the first axis A. Accordingly, when seen from the direction along the first axis A, the virtual straight line L that connects the first axis A and the second axis B is inclined with respect to the axis O of the spool shaft 2. Specifically, the virtual straight line L that connects the first axis A and the second axis B is inclined, with respect to the axis O of the spool shaft 2, in the direction that approaches the lower part of the reel body 1, close to the rear part of the reel body 1. In the present embodiment, the inclination angle a, which is the angle between the virtual straight line L and the axis O of the spool shaft 2, is substantially 27.5 degrees. Meanwhile, in the present embodiment, the direction along the first axis A is substantially the same direction as the drive shaft direction.

Rotation Transmission Body 23

The rotation transmission body 23 is an annular belt member that forms a bridge between the first rotating body 21 and the second rotating body 22. The rotation transmission body 23 transmits the rotation of the first rotating body 21 to the second rotating body 22. The rotation transmission body 23 includes a perimeter portion that has engaging teeth 23a that mesh with the plurality of first tooth portions 21a of the first rotating body 21 and the plurality of second tooth portions 22a of the second rotating body 22. Accordingly, the rotation transmission body 23 circulates around the first rotating body 21 and the second rotating body 22 accompanying the rotation of the handle 6. When seen from the drive shaft direction, the rotation transmission body 23 is inclined in the direction that approaches the lower part of the reel body 1 close to the rear part of the reel body 1.

Rotation Transmission Mechanism 24

The rotation transmission mechanism 24 transmits the rotation of the handle 6 to the first rotating body 21. The rotation transmission mechanism 24 comprises a first gear 24a, a second gear 24b, and a third gear 24c. The first gear 24a is mounted on the drive shaft 11 so as to be integrally rotatable therewith. The second gear 24b is rotatably mounted on a support shaft 33 that is cantilevered on the reel body 1. The second gear 24b meshes with the first gear 24a. The third gear 24c is mounted on the first shaft 31 so as to be integrally rotatable therewith and meshes with the second gear 24b. When the rotation of the handle 6 is transmitted to the third gear 24c from the first gear 24a via the second gear 24b by the rotation transmission mechanism 24, the first rotating body 21 that is coupled with the first shaft 31 is rotated accompanying the rotation of the third gear 24c.

Figure 2:
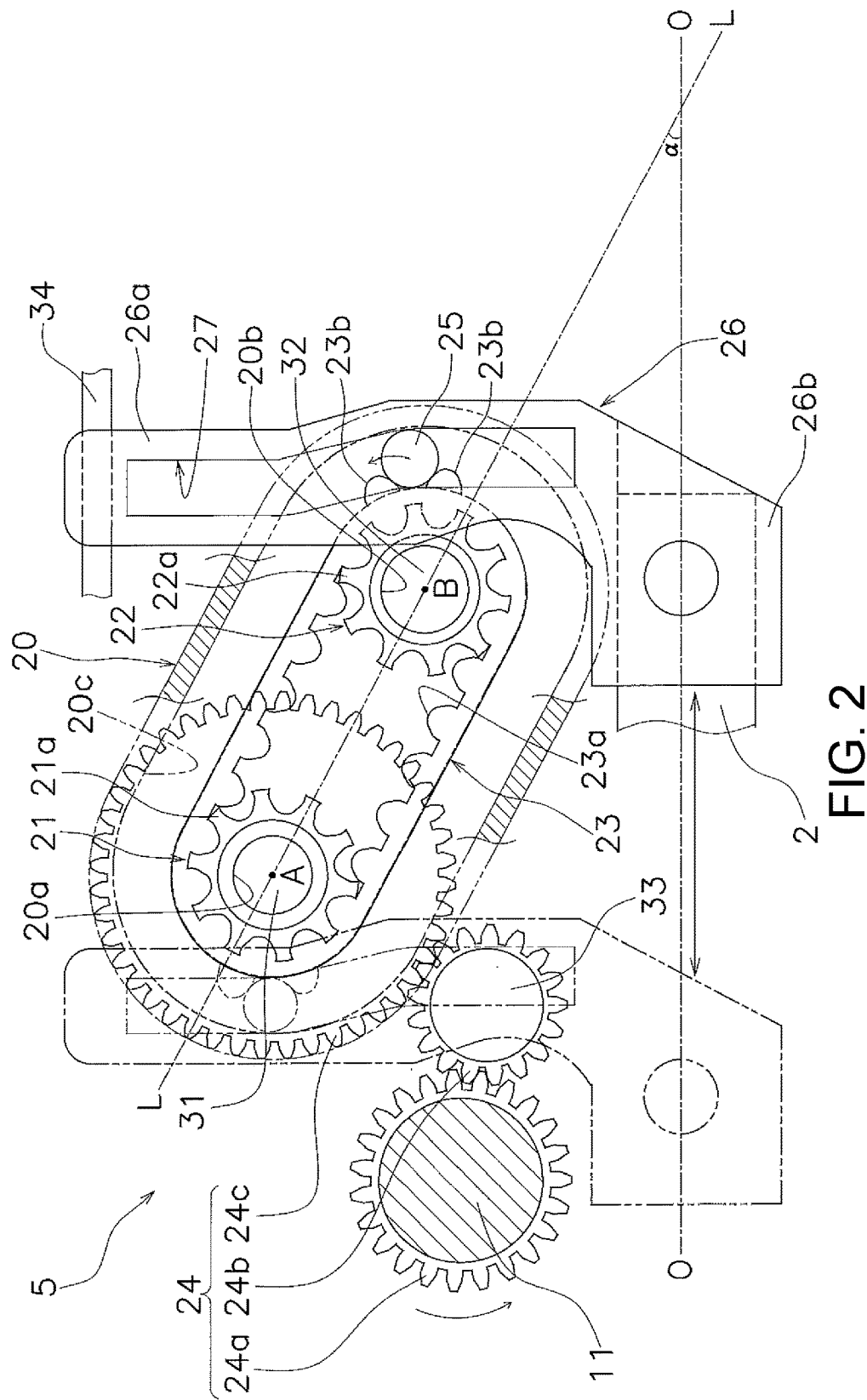
FIG. 2 is an enlarged view of a reciprocating mechanism.

Meanwhile, in the present embodiment, in FIG. 2, when the handle 6 is rotated in the fishing line winding (reeling) direction, since the drive shaft 11 is rotated in the counterclockwise direction, the first gear 24a mounted on the drive shaft 11 so as to be integrally rotatable therewith is also rotated in the counterclockwise direction. That is, when reeling the fishing line, since the first rotating body 21 is rotated in the counterclockwise direction by the rotation transmission mechanism 24, the rotation transmission mechanism 23 circulates in the counterclockwise direction.

Engagement Body 25

The engagement body 25 is a cylindrical-shape pin member extending in the drive shaft direction, and is fixed to the rotation transmission body 23 so as to circulate together with the rotation transmission body 23. Specifically, one end portion of the engagement body 25 is fixed, using a fixing method such as adhesion, etc., between a pair of convex portions 23b of the rotation transmission body 23. The other end portion of the engagement body 25 is inserted thorough the guide hole 20c of the housing 20 and the guide groove 27 of the movable body 26 that will be described below. Accordingly, the engagement body 25 moves within the guide hole 20c and the guide groove 27 accompanying the reciprocation of rotation transmission body 23 and the movable body 26.

Movable Body 26

The movable body 26, a part of which engages the rotation transmission body 23, is reciprocated in the spool shaft direction together with the spool shaft 2 accompanying the circulation of the rotation transmission body 23. The movable body 26 comprises a main body portion 26a, a shaft mounting part 26b, and a guide groove 27. The main body portion 26a is formed extending in a direction that intersects with the spool shaft 2. In the present embodiment, the main body portion 26a is formed extending in the up and down direction with respect to the reel body 1. The shaft mounting part 26b is disposed at the lower end of the main body portion 26a. The spool shaft 2 is non-rotatably mounted on the shaft mounting portion 26b with fixing members such as screws, etc. On the upper end portion of the main body portion 26a, a guide shaft 34 that is disposed to be parallel to the spool shaft 2 is inserted. The guide shaft 34 supports the movable body 26 so as to be movable in the spool shaft direction.

The guide groove 27 extends through the main body portion 26a in the drive shaft direction and is formed extending in a direction that intersects with the spool shaft 2. In the present embodiment, the guide groove 27 is extends in the up and down direction with respect to the reel body 1. The engagement body 25 that circulates together with the rotation transmission body 23 engages the guide groove 27. When the engagement body 25 circulates together with the rotation transmission body 23, the engagement body 25 moves within the guide groove 27 along the guide groove 27. Accordingly, the movable body 26 reciprocates in the spool shaft direction accompanying the circulation of the engagement body 25.

Figure 3:
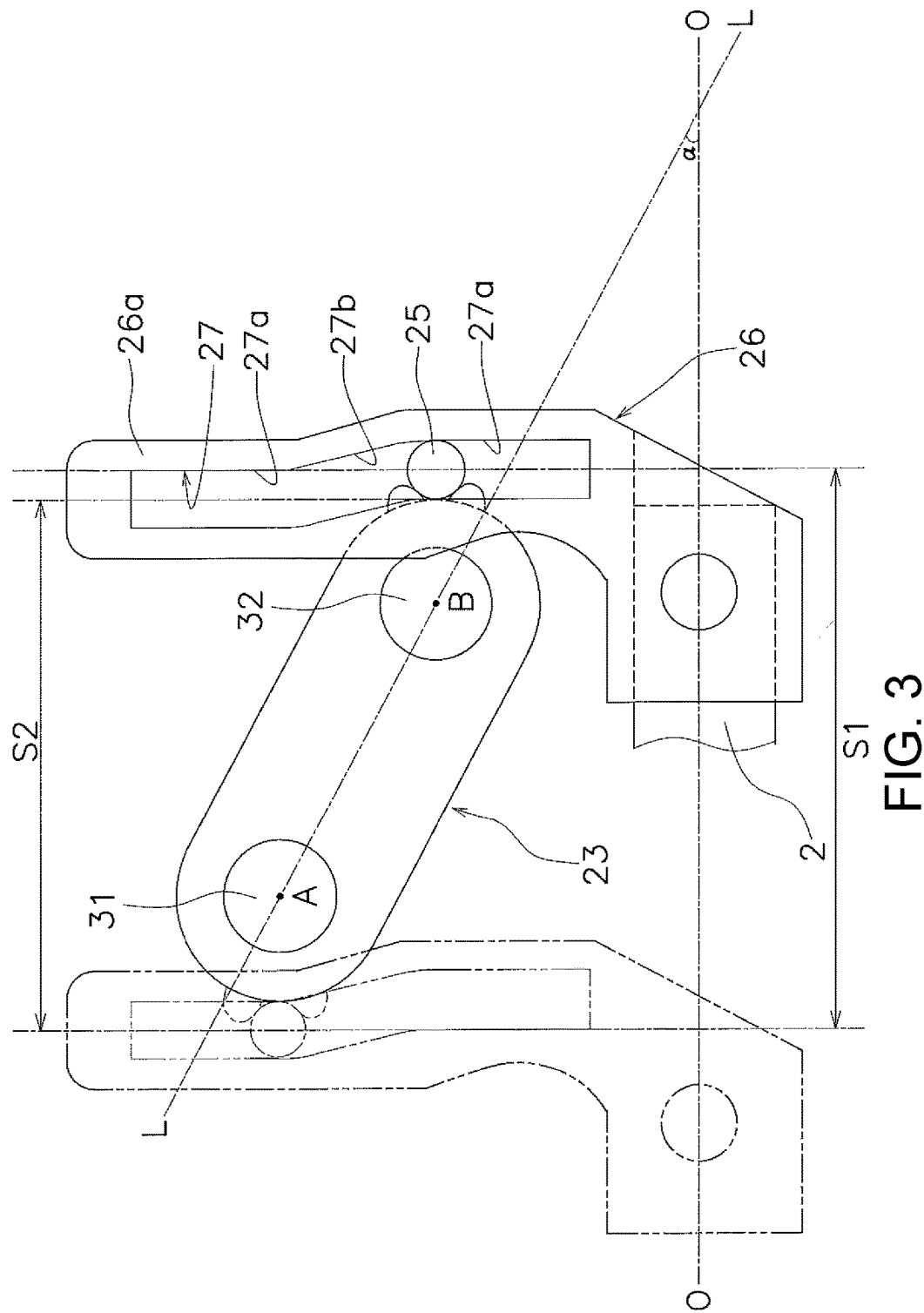
FIG. 3 is a diagram that shows a comparison between the stroke amounts of an engagement body and a movable body.

The guide groove 27 comprises straight portions 27a. As shown in FIG. 3, in the present embodiment, the guide groove 27 comprises first and second straight portions 27a at both ends, and the first and second straight portions 27a are disposed offset from each other in the spool shaft direction. In the present invention, the first and second straight portion 27a on the lower end side of the guide groove 27 is disposed more rearward of the reel body portion 1 than the upper end side. Meanwhile, in FIG. 3, in order to make the drawing easier to see, the configurations of the housing 20, the rotation transmission mechanism 24, etc. are omitted.

The guide groove 27 further comprises an inclined portion 27b. In the present embodiment, the inclined portion 27b is formed in an intermediate portion of the guide groove 27, and connectedly disposed at between the first and second straight portions. When seen from the drive shaft direction, the inclined portion 27b is formed inclined with respect to the straight portion 27a. Specifically, the inclined portion 27b is formed inclined in the direction that approaches the lower part of the reel body 1 close to the rear part of the reel body 1. Meanwhile, the straight portion 27a and the inclined portion 27b are connected in a smooth curve in order to smoothly guide the movement of the engagement body 25.

The Behavior of the Reciprocating Mechanism

Next, the behavior of the reciprocating mechanism 5 will be described. When the handle 6 is rotationally operated, the drive shaft 11 that is coupled to the handle 6 is rotated. When the drive shaft 11 is rotated, the first gear 24a that is mounted on the drive shaft 11 so as to be integrally rotatable therewith is rotated. The rotation of the first gear 24a is transmitted to the second gear 24b and the third gear 24c by the rotation transmission mechanism 24. Then, the first rotating body 21 that is coupled to the first shaft 31 is rotated accompanying the rotation of the third gear 24c. The rotation of the first rotating body 21 is transmitted to the second rotating body 22 by the rotation transmission body 23, and the rotation transmission body 23 circulates. Then, by the engagement body 25 that circulates together with the rotation transmission body 23 moving within the guide groove 27 along the guide groove 27, the spool shaft 2 that is fixed on the movable body 26 is reciprocated together with the movable body 26 in the spool shaft direction.

Figure 5:
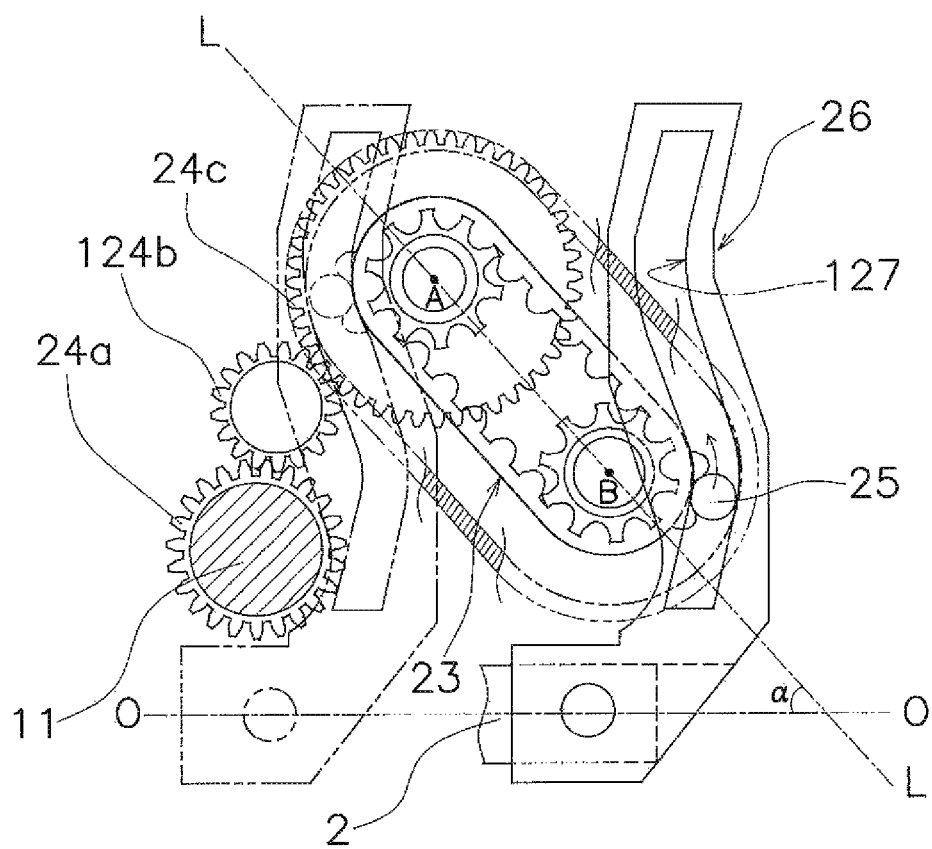
FIG. 5 is a diagram corresponding to FIG. 2 of another embodiment.
Figure 6:
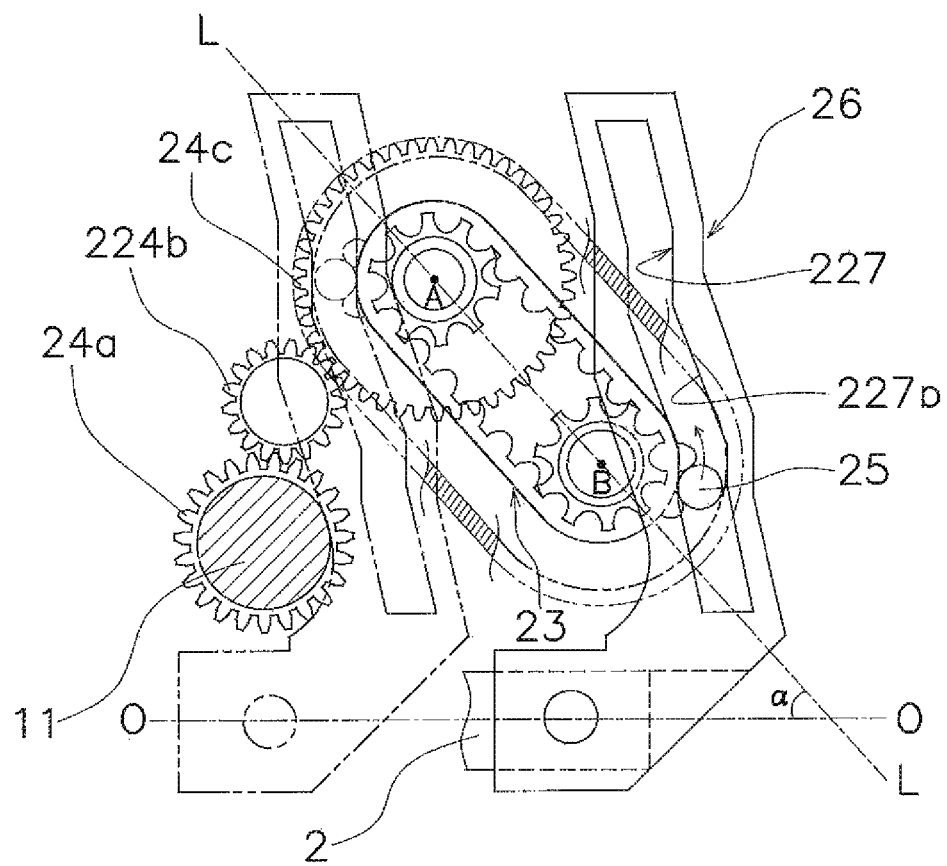
FIG. 6 is a diagram corresponding to FIG. 2 of another embodiment.

As has been described, in the present embodiment, when seen from the drive shaft direction (a direction along the first axis A), since the virtual straight line L that connects the first axis A and the second axis B are inclined with respect to the axis O of the spool shaft 2, the rotation transmission body 23 that is bridged between the first rotating body 21 and the second rotating body 22 is disposed on the reel body 1, inclined with respect to the spool shaft 2. Accordingly, in comparison to when the first shaft 31 and the second shaft 32 are disposed along the spool shaft direction, that is, in comparison to when the rotation transmission body 23 is disposed along the spool shaft direction, the amount of movement (hereinafter referred to as stroke amount) in the spool shaft direction of the engagement body 25 that circulates together with the rotation transmission body 23 is decreased. Accordingly, the stroke amount of the spool shaft 2 can be adjusted without changing the circumferential length of the rotation transmission body 23. That is, by adjusting the inclination angle a, which is the angle between the virtual straight line L that connects the first axis A and the second axis B and the axis O of the spool shaft 2, to match the shape, etc. of the reel body 1 and the spool 3, the stroke amount of the spool shaft 2 can be adjusted without changing the circumferential length of the rotation transmission body 23. For example, as shown in FIG. 5 and FIG. 6, when the inclination angle a is increased relative to FIG. 2, the stroke amount of the spool shaft 2 can be set to be shorter without changing the circumferential length of the rotation transmission body 23.

Furthermore, as shown in FIG. 3, since the straight portions 27a at both ends of the guide groove 27 are disposed offset from each other in the spool shaft direction, the stroke amount S2 of the spool shaft 2 is shorter than the stroke amount S1 of the engagement body 25. Accordingly, when disposing the rotation transmission body 23 to be inclined with respect to the spool shaft 2, by disposing the straight portions 27a at both ends of the guide groove 27 offset from each other, the stroke amount of the spool shaft 2 can be adjusted.

Figure 4:
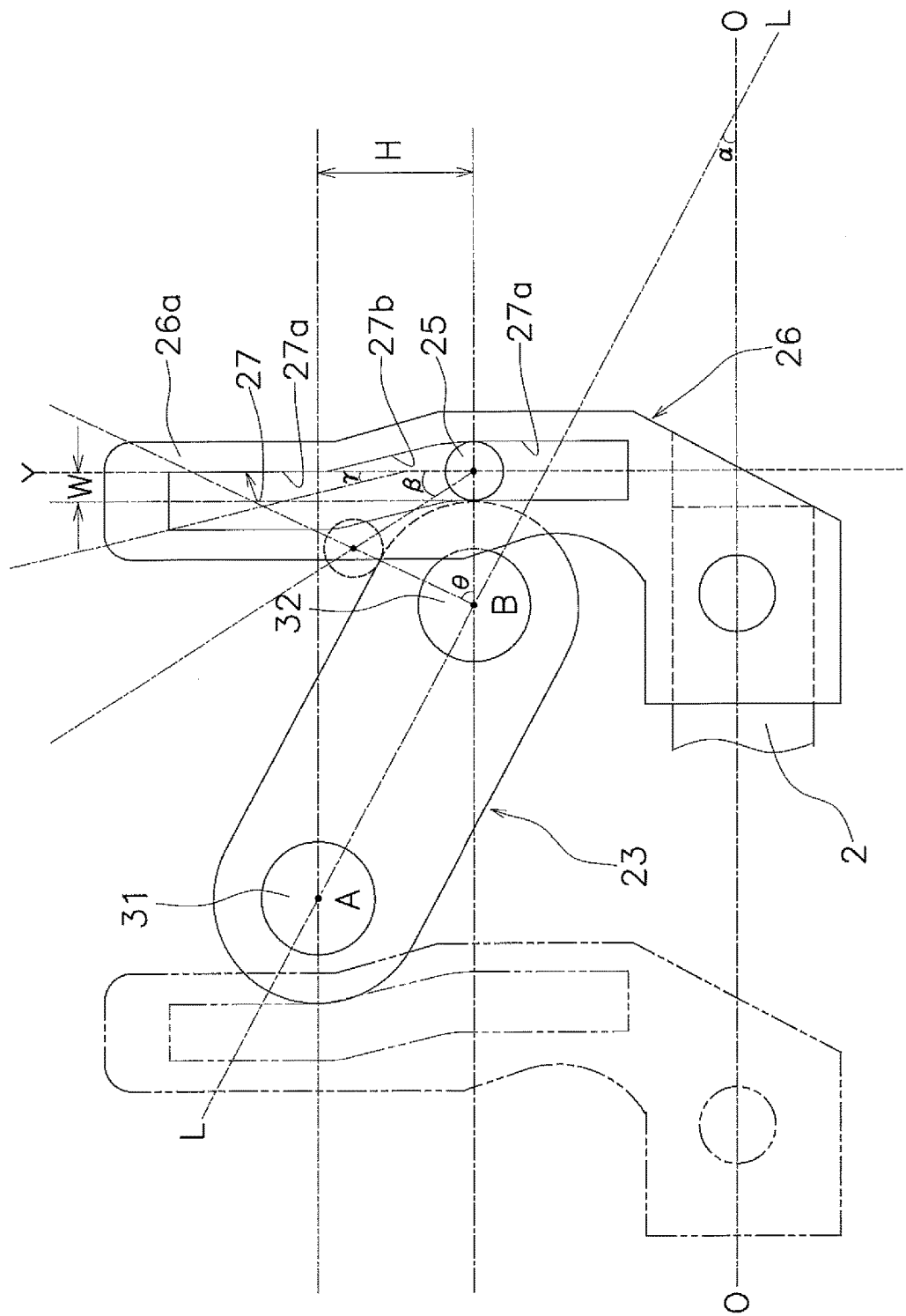
FIG. 4 is a diagram that shows the relationship between the offset amount of a guide groove and the inclination start position.

Meanwhile, when offsetting the straight portions 27a at both ends of the guide groove 27 and inclining the inclined portion 27b, depending on the configuration of the offset amount W as shown in FIG. 4 and the inclination start position H of the inclined portion 27b, there are situations in which the circulation of the engagement body 25 is hindered by the guide groove 27. Thus, it is preferable to set an offset amount W and an inclination start position H so that the angle y between the inclined portion 27b and the Y axis is smaller than the angle β, when the rotational radius (the distance from the center of the engagement body 25 to the second axis B) of the engagement body 25 is R and the initial coordinates of the engagement body 25 are (0, 0), between the virtual straight line that connects the initial coordinates and the coordinates of the engagement body 25 (R(1−cos θ), R sin θ) after the engagement body 25 is rotated by an angle of θ from the initial coordinates and the Y axis, with the second axis B as the center. By setting the offset amount W and the inclination start position H of the inclined portion 27b in this way, the circulation of the engagement body 25 is not be hindered by the guide groove 27.

Other Embodiments

One embodiment of the present invention is described above, but the present invention is not limited to the above-described embodiment, and various modifications can be made without departing from the scope of the invention. Specifically the various embodiments and modified examples described in the present Specification can be freely combined according to necessity.

The shape of the guide groove 27 is not limited to the embodiment described above. The shape of the guide groove 27 may be appropriately changed to match the shape, etc. of the spool 3. Since, depending on the shape of the guide groove 27, the reeling pitch when reeling the fishing line can be changed, an optimal reeling shape can be obtained. For example, as shown in FIG. 5, the guide groove 127 may be substantially S-shaped, when seen from the drive shaft direction. In this embodiment, the movement speed of the movable body 26 in the spool shaft direction with respect to the rotational angle of the first rotating body 21 and the second rotating body 22 can be increased. Meanwhile, the guide groove may be configured just from at least one straight portion 27a or at least one inclined portion 27b.

Alternatively, as shown in FIG. 6, both ends of the guide groove 227 may be inclined in the same direction as the inclined portion 227b. In this embodiment, the movement speed of the movable body 26 in the spool shaft direction with respect to the rotational angle of the first rotating body 21 and the second rotating body 22 can be decreased.

In the embodiment described above, a second gear 24b can be disposed on the rotation transmission mechanism 24, although providing the second gear 24b is not necessarily required. If the third gear 24c can be disposed in a position so as to mesh with the first gear 24a, it is possible for the rotation of the first gear 24a to be directly transmitted to the third gear 24c, without providing a second gear 24b. Furthermore, as shown in FIG. 5 and FIG. 6, the positions of the second gears 124b and 224b may be appropriately changed and disposed depending on the inclination angle, etc. of the rotation transmission body 23.

In the embodiment described above, the virtual straight line L that connects the first axis A and the second axis B are inclined in the direction that approaches the lower part of the reel body 1 close to the rear part of the reel body 1, but depending on the shape of the reel body 1, the virtual straight line L that connects the first axis A and the second axis B may be inclined in the direction that approaches the upper part of the reel body 1 close to the rear part of the reel body 1.

What is claimed is:

1. A reciprocating mechanism for a fishing reel to reciprocate a spool shaft in a spool shaft direction when a handle is rotated, comprising:
   a first rotating body configured to rotate around a first axis extending in a direction perpendicular to the spool shaft direction;
   a second rotating body configured to rotate around a second axis disposed at a spaced apart from the first rotating body along the spool shaft direction, and parallel to the first axis;
   a rotation transmission body bridged between the first rotating body and the second rotating body, and configured to circulate and transmit a rotation of the first rotating body to the second rotational body when the handle is rotated; and a movable body engaging the rotation transmission body, the movable body configured to reciprocate in the spool shaft direction together with the spool shaft, when the rotation transmission body is circulated, a virtual straight line that connects the first axis and the second axis is inclined with respect to spool shaft direction when viewed from a direction along the first axis.

2. The reciprocating mechanism for a fishing reel according to claim 1, wherein the second axis is disposed rearward of the first axis in the spool shaft direction, when viewed from the spool shaft direction, the second axis is positioned lower than the first axis.

3. The reciprocating mechanism for a fishing reel according to claim 1, further comprising an engagement body fixed on the rotation transmission body and configured to circulate together with the rotation transmission body, the movable body comprises a guide groove along in a direction that intersects the spool shaft direction and to which the engagement body engages, and the engagement body is configured to move within the guide groove when the rotation transmission body is circulated and the movable body is reciprocated.

4. The reciprocating mechanism for a fishing reel according to claim 3, wherein the guide groove comprises an inclined portion.

5. The reciprocating mechanism for a fishing reel according to claim 4, wherein the guide groove further comprises a straight portion which includes a first straight portion and a second straight portion with the first straight portion disposed at a first end of the guide groove and a second straight portion disposed at a second end of the guide groove, the first and second straight portions being disposed offset from each other in the spool shaft direction, and the inclined portion connectedly disposed in-between the first and second straight portions.

6. The reciprocating mechanism for a fishing reel according to claim 3, wherein the guide groove comprises a straight portion.

7. The reciprocating mechanism for a fishing reel according to claim 6, wherein the straight portion includes a first straight portion and a second straight portion with the first straight portion disposed at a first end of the guide groove and a second straight portion disposed at a second end of the guide groove, and the first and second straight portions being disposed offset from each other in the spool shaft direction.

* * * * *